(12) United States Patent
Nii et al.

(10) Patent No.: US 9,744,890 B2
(45) Date of Patent: Aug. 29, 2017

(54) VEHICLE SEAT

(71) Applicant: TOYOTA BOSHOKU KABUSHIKI KAISHA, Aichi-ken (JP)

(72) Inventors: Tomoki Nii, Kasugai (JP); Hiroyuki Hatano, Kasugai (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 59 days.

(21) Appl. No.: 14/881,357

(22) Filed: Oct. 13, 2015

(65) Prior Publication Data

US 2016/0107551 A1    Apr. 21, 2016

(30) Foreign Application Priority Data

Oct. 16, 2014 (JP) ................................ 2014-211672

(51) Int. Cl.
*B60N 2/56* (2006.01)
*B60N 2/00* (2006.01)

(52) U.S. Cl.
CPC .......... *B60N 2/5642* (2013.01); *B60N 2/002* (2013.01); *B60N 2/5657* (2013.01); *B60N 2/5678* (2013.01); *B60N 2/5685* (2013.01)

(58) Field of Classification Search
CPC .. B60N 2/5678; B60N 2/5642; B60N 2/5657; B60N 2/002; B60N 2/5685
USPC ............... 297/180.12, 180.13, 180.14, 180.1
See application file for complete search history.

(56) References Cited

U.S. PATENT DOCUMENTS

| | | | | |
|---|---|---|---|---|
| 6,059,018 A * | 5/2000 | Yoshinori | .......... | B60H 1/00285 165/41 |
| 6,179,706 B1 * | 1/2001 | Yoshinori | ............ | B60N 2/5635 297/180.14 |
| 6,186,592 B1 * | 2/2001 | Orizaris | ............... | B60N 2/5635 297/180.12 |
| 6,196,627 B1 * | 3/2001 | Faust | ................... | B60N 2/5635 297/180.1 |
| 6,291,803 B1 * | 9/2001 | Fourrey | ................... | B60N 2/58 219/202 |
| 6,478,369 B1 * | 11/2002 | Aoki | .................. | B60H 1/00271 297/180.1 |
| 6,685,553 B2 * | 2/2004 | Aoki | .................... | B60N 2/5635 297/180.14 |

(Continued)

FOREIGN PATENT DOCUMENTS

JP    2013-216196    10/2013

*Primary Examiner* — Milton Nelson, Jr.
(74) *Attorney, Agent, or Firm* — Greenblum & Bernstein, P.L.C.

(57) ABSTRACT

A vehicle seat including a seat pad including a flow channel portion, a seat cover covering the seat pad and having breathability, a functional member disposed between the seat pad and the seat cover and having breathability, and a blowing member configured to blow the gas into or out of the seat through the flow channel portion of the seat pad and the seat cover along a flow path, wherein the functional member is integrated with any one of the seat pad and the seat cover with an adhesive portion, which has poorer breathability than the seat cover and the functional member, interposed therebetween, and wherein the adhesive portion includes a passage portion through which the gas is configured to pass, and the passage portion is disposed in the flow path of the gas.

12 Claims, 7 Drawing Sheets

(56) References Cited

U.S. PATENT DOCUMENTS

| | | | | |
|---|---|---|---|---|
| 6,808,230 B2* | 10/2004 | Buss | B60N 2/5657 | 297/180.12 |
| 6,848,742 B1* | 2/2005 | Aoki | B60N 2/5635 | 297/180.14 |
| 6,929,322 B2* | 8/2005 | Aoki | B60H 1/00285 | 297/180.13 |
| 7,201,441 B2* | 4/2007 | Stoewe | B60N 2/5657 | 297/180.1 |
| 7,213,876 B2* | 5/2007 | Stoewe | B60N 2/5657 | 297/180.1 |
| 7,452,028 B2* | 11/2008 | Knoll | A47C 7/74 | 297/180.1 |
| 7,478,869 B2* | 1/2009 | Lazanja | B60N 2/5635 | 297/180.13 |
| 7,828,050 B2* | 11/2010 | Esaki | B60H 1/00285 | 165/202 |
| 8,807,647 B2* | 8/2014 | Sahashi | B60N 2/1615 | 297/180.13 |
| 8,919,874 B2* | 12/2014 | Ota | B60N 2/5642 | 297/180.13 |
| 2002/0096915 A1* | 7/2002 | Haupt | B60H 1/00285 | 297/180.13 |
| 2003/0214160 A1* | 11/2003 | Brennan | A47C 7/74 | 297/180.14 |
| 2004/0090093 A1* | 5/2004 | Kamiya | B60N 2/5657 | 297/180.14 |
| 2005/0093347 A1* | 5/2005 | Bajic | B60N 2/5635 | 297/180.13 |
| 2005/0173950 A1* | 8/2005 | Bajic | A47C 7/72 | 297/180.14 |
| 2006/0138812 A1* | 6/2006 | Aoki | B60N 2/5635 | 297/180.14 |
| 2006/0175877 A1* | 8/2006 | Alionte | A47C 7/74 | 297/180.14 |
| 2006/0214480 A1* | 9/2006 | Terech | B60N 2/5635 | 297/180.13 |
| 2007/0069554 A1* | 3/2007 | Comiskey | B60N 2/5635 | 297/180.12 |
| 2009/0031742 A1* | 2/2009 | Seo | B60N 2/5657 | 62/244 |
| 2009/0121525 A1* | 5/2009 | Nishide | B60N 2/5657 | 297/180.13 |
| 2009/0134675 A1* | 5/2009 | Pfahler | B60N 2/5635 | 297/180.1 |
| 2009/0218855 A1* | 9/2009 | Wolas | B60N 2/5657 | 297/180.14 |
| 2010/0001558 A1* | 1/2010 | Petrovski | A47C 7/74 | 297/180.12 |
| 2013/0097777 A1* | 4/2013 | Marquette | A47C 7/74 | 5/423 |
| 2013/0264742 A1 | 10/2013 | Ota et al. | | |

* cited by examiner

VEHICLE SEAT

CROSS-REFERENCE TO RELATED APPLICATIONS

This application claims priority from Japanese Patent Application No. 2014-211672 filed on Oct. 16, 2014, the entire contents of which are incorporated herein by reference.

TECHNICAL FIELD

Aspects of the present invention relate to a vehicle seat including a functional member (such as a heater member) disposed by adhesion between a seat pad and a seat cover and a blowing member feeding or suctioning gas therethrough.

BACKGROUND

As such a type of vehicle seat, a vehicle seat including a seat pad, a seat cover, and a blowing member is known (see JP-A-2013-216196). The seat pad is a member that forms a seat profile to support an occupant and is typically formed of a foamed resin. The seat cover is a bag-shaped member that can cover the seat pad and includes a first part on a seating side and a second part on a rear side. The first part is formed by integrating a surface portion, a functional portion, and a spacer portion in a stacked manner. The surface portion is a breathable sheet member forming a seating surface and is formed by suturing a plurality of surface pieces formed of fabric. The functional portion (corresponding to a functional member) is a breathable unified sheet member and can emit heat with a supply of power. The spacer portion is a low-breathability sheet member formed of slab urethane and has through-holes formed therein. The second part is a low-breathability or non-breathable sheet member and is formed of for example, low-breathability slab urethane.

In related-art, the first part and the second part are stacked and integrated, thereby forming a seat cover. Then, the seat cover is integrated with the seat pad by molding the seat pad after disposing the seat cover in a molding machine of the seat pad in advance. Hole portions (flow channel portions) penetrating the seat pad in a thickness direction thereof are formed to extend to the middle part of the seat cover (from the second part to a part of the spacer in which the through-holes are formed). Accordingly, gas fed from the blowing member can pass through the flow channel portions, pass through the seat cover, and be blown out to the outside.

In the field of vehicle seats, suture lines (design lines) may be formed between the neighboring surface pieces at the time of formation of the seat cover (surface portion). For example, in related art, a plurality of surface pieces are sequentially arranged in a seat front-rear direction at the center of the seat cushion and are integrated with a functional portion (a piece of sheet member). In this state, the functional portion is folded at proper positions and the surface pieces are superposed on each other (arranged in an inside-out shape). Then, by suturing the surface pieces superposed in the folded shape at the ends while appropriately changing the direction, a suture line extending in the seat width direction can be formed.

In the field of vehicle seats, from the viewpoint of improvement in design property of a seat, it is preferable that a suture line having an appropriate shape (for example, a curved suture line) can be formed. However, according to the configuration of the related art (the configuration in which the surface portion and the functional portion are integrated), a piece of functional portion may interfere with changing of the directions of the surface pieces and the degree of freedom in shape of the suture line tends to be limited. On the other hand, the functional portion may be integrated after the plurality of surface pieces are sutured to form the surface portion (attached later). In this case, from the viewpoint of attachment stability of the functional portion, an adhesive portion having poor breathability is disposed between the functional portion and the surface portion. However, in this case, the gas flow tends to be extremely disrupted in the adhesive portion, and therefore, the blowing performance is likely to degrade. Even in a configuration in which the seat cover is covered after the functional portion is attached onto the seat pad (flow channel portion), the gas flow tends to be extremely disrupted in the adhesive portion for the similar reason.

SUMMARY

Aspects of the present invention have been made in consideration of the above-described circumstances and an object thereof is to dispose a functional member between a seat cover and a seat pad by adhesion with improved performance.

According to an aspect of the present invention, there is provided a vehicle seat including: a seat pad forming an outer shape of the seat, configured to elastically support an occupant, and including a flow channel portion through which gas is configured to pass a seat cover covering the seat pad and having breathability; a sheet-like or linear functional member disposed between the seat pad and the seat cover and having breathability; and a blowing member configured to feed and suction gas, wherein the blowing member is configured to blow the gas into or out of the seat through the flow channel portion of the seat pad and the seat cover along a flow path, wherein the functional member is integrated with any one of the seat pad and the seat cover with an adhesive portion, which has poorer breathability than the seat cover and the functional member, interposed therebetween, and wherein the adhesive portion includes a passage portion through which the gas is configured to pass, and the passage portion is disposed in the flow path of the gas.

According to another aspect of the present invention, there is provided a vehicle seat including: a seat pad including a first through-hole penetrating the seat pad in a thickness direction of the seat pad; a seat cover covering the seat pad and having breathability; a functional member disposed between the seat pad and the seat cover in the thickness direction and having breathability; an adhesive portion by which the functional member is integrated with any one of the seat pad and the seat cover, the adhesive portion having poorer breathability than the seat cover and the functional member and including a second through-hole penetrating the adhesive portion in the thickness direction; and a blowing member communicating with the first through-hole and configured to feed and suction gas; wherein the first through-hole and the second through-hole overlap with each other in the thickness direction.

Accordingly, it is possible to dispose the functional member between the seat cover and the seat pad by adhesion with improved performance.

DETAILED DESCRIPTION

Figure 1:
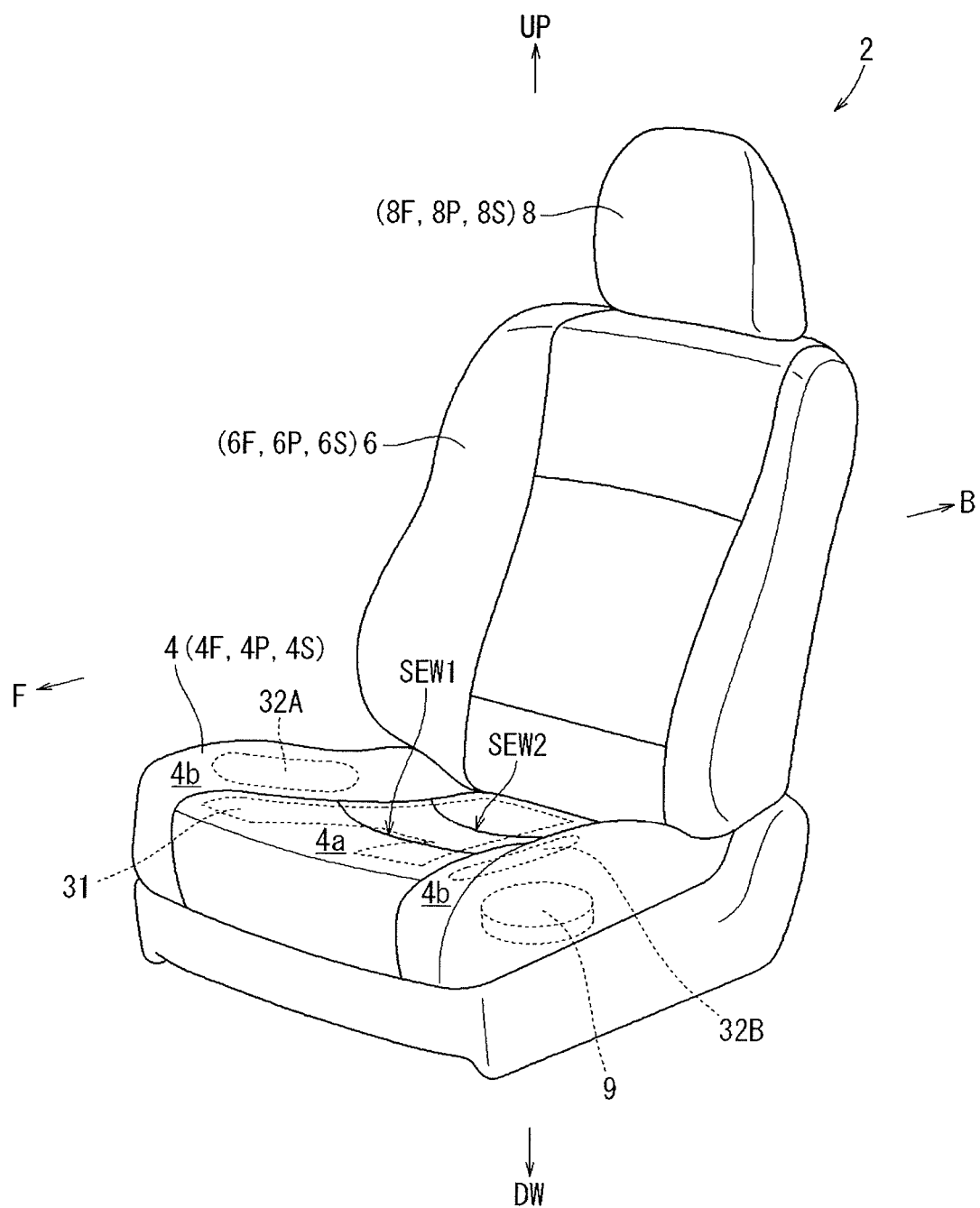
FIG. 1 is a partial perspective view of a vehicle seat.

Hereinafter, an embodiment of the present invention will be described with reference to FIGS. 1 to 8. In the drawings, a front side of a vehicle seat is denoted by reference sign F, a back side of the vehicle seat is denoted by reference sign B, an upside of the vehicle seat is denoted by reference sign UP, and a downside of the vehicle seat is denoted by reference sign DW. A vehicle seat 2 illustrated in FIG. 1 includes a seat cushion 4, a seat back 6, and a headrest 8. Each of these seat constituent members includes a seat frame (4F, 6F, 8F) forming a seat framework, a seat pad (4P, 6P, 8P) forming a seat profile, and a seat cover (4S, 6S, 8S) covering the seat pad. In this embodiment, the seat back 6 is tiltably connected to the rear part of the seat cushion 4 and the headrest 8 is disposed on the top of the seat back 6 (in an upright state).

The seat cushion 4 includes the above-described basic constituent members (4F, 4P, 4S), a blowing member 9, a plurality of functional members 31, 32A, and 32B, and a plurality of adhesive portions 51 to 56 (see FIGS. 1 to 5). The details of the members will be appropriately described later. The blowing member 9 is a hollow case member having a cylindrical shape and has a blowing mechanism built therein. For example, a centrifugal mechanism (mechanism in which air is suctioned from an axis direction and is blown in a centrifugal direction) can be used as the blowing mechanism. Examples of such a type of blowing mechanism include a multiblade fan (sirocco fan), a plate fan, a turbo fan, an airfoil fan, and a limited-load fan. In this embodiment, the blowing member 9 is fixed to the seat frame 4F which is typically a substantially rectangular frame formed of metal and is disposed on the rear side of the seat pad 4P.

In this embodiment, as will be described later, the functional members 31, 32A, and 32B are disposed by adhesion between the seat pad 4P and the seat cover 4S with the adhesive portions 51 to 56 interposed therebetween. In the central front part of the seat cushion 4, gas fed from the blowing member 9 passes through the seat pad 4P, the specific functional member 31, and the seat cover 4S and is blown out to the outside from the seating surface side. At this time, in the above-described seat configuration, parts having poor breathability (such as the specific adhesive portions 51 and 52) may interfere with the flow of gas to deteriorate the blowing performance. Therefore, in this embodiment, the specific functional member 31 is disposed by adhesion between the seat cover 4S and the seat pad 4P with improved performance (so as to suitably maintain the blowing performance) by a configuration described later. Hereinafter, each configuration will be described in detail.

<Seat Pad>

Figure 2:
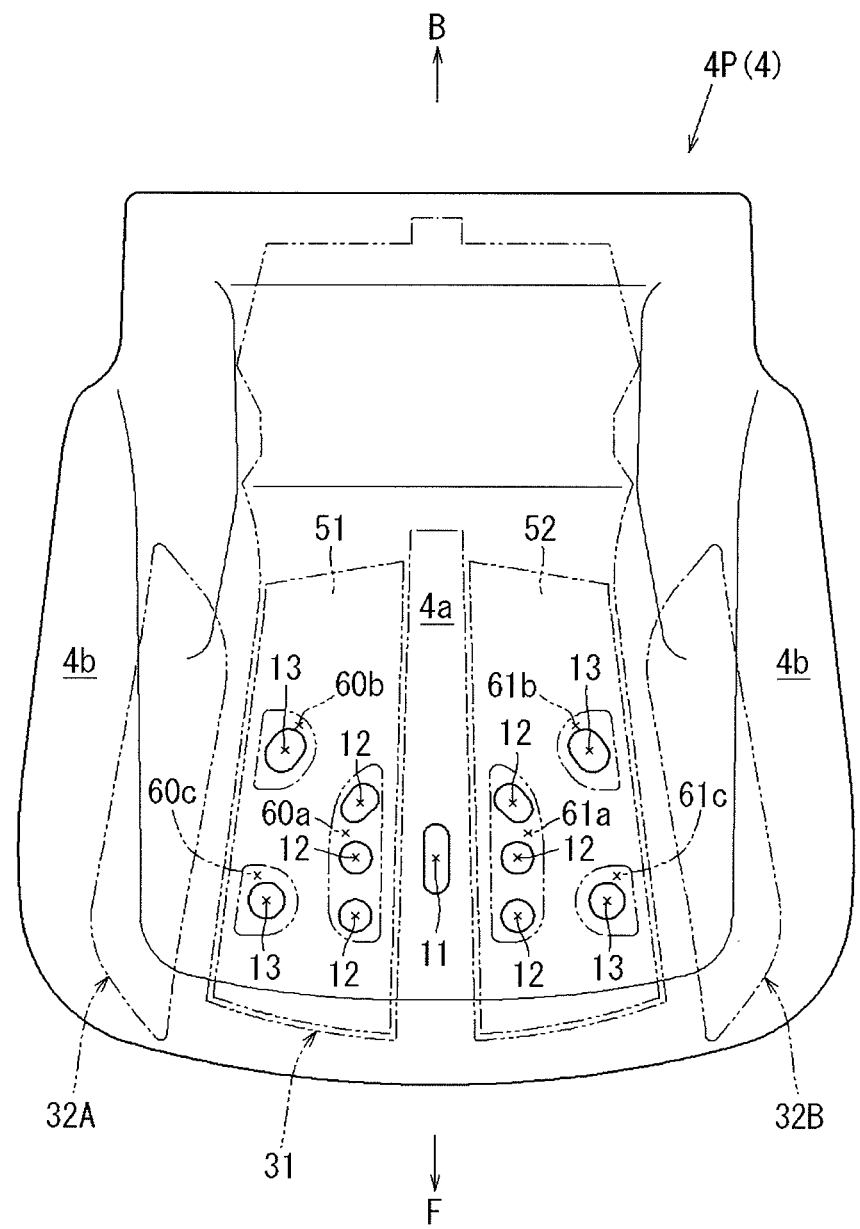
FIG. 2 is a top view of a seat pad.
Figure 7:
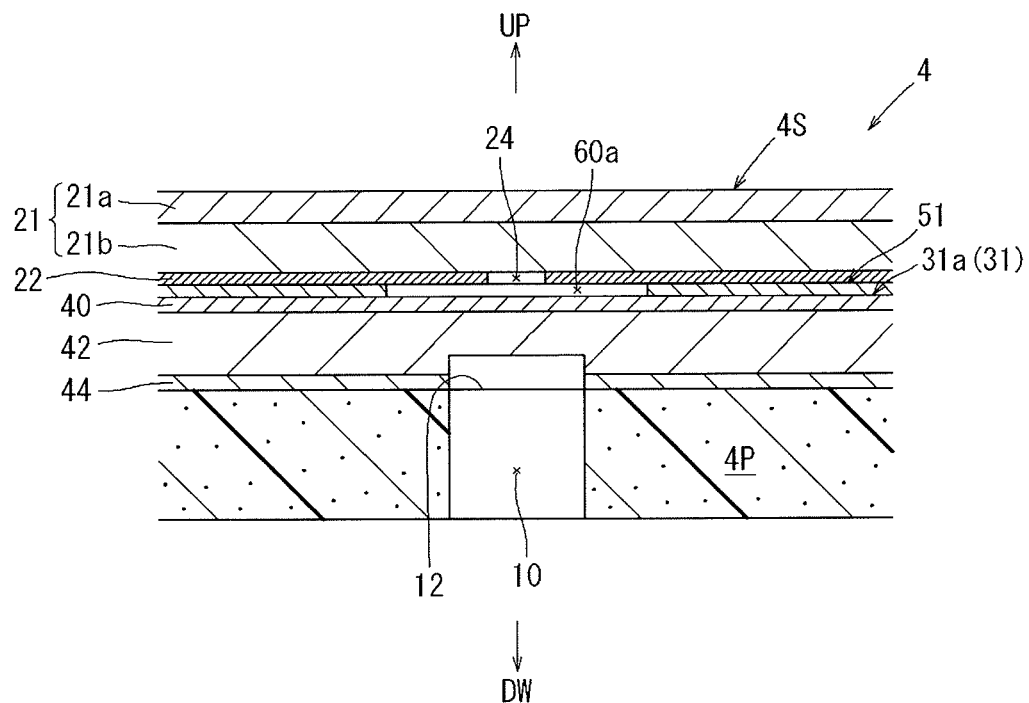
FIG. 7 is a partial cross-sectional view of a seat cushion.

The seat pad 4P is a member (of a substantially rectangular shape) capable of elastically supporting an occupant and includes a main top plate portion 4a, lateral top plate portions 4b, and flow channel portions 10 through which gas can pass (see FIGS. 2 and 7). The material of the seat pad 4P is not particularly limited and an example thereof is a foamed resin such as polyurethane foam (with a density of 10 kg/m$^3$ to 60 kg/m$^3$). The main top plate portion 4a is a flat portion at the center of the seat pad 4P (see FIG. 2). The main top plate portion 4a in this embodiment has a shape swelling while being curved upward on the rear side of the seat (see FIG. 8). The lateral top plate portions 4b are protruding parts disposed on both sides of the main top plate portion 4a and can support side parts of an occupant, for example, at the time of cornering.

The flow channel portions 10 include a plurality of through-holes penetrating the seat pad 4P in the thickness direction thereof, and include a plurality of outlets 11, 12, 13 (see FIGS. 2 and 7; a method of forming the flow channel portions will be described later). The plurality of outlets (a central outlet 11, inside outlets 12, and outside outlets 13) are formed at appropriate intervals in the front part (surface) of the seat pad 4P and are arranged around an occupant's legs (not illustrated) in a seated state. For example, in this embodiment, the central outlet 11 of a substantially rectangular shape is formed at the center of the front part of the seat pad 4P. The inside outlets 12 are formed at an inner side of the occupant's legs in a seated state and the outside outlets 13 are formed at an outer side of the occupant's legs in a seated state. In this embodiment, openings (not illustrated) of the flow channel portions 10 on the rear surface of the seat pad 4P communicate with the blowing member 9 via a duct member (not illustrated) (see FIGS. 1 and 7). Accordingly, gas fed from the blowing member 9 flows in the flow channel portions 10 and blows out of the outlets 11 to 13 (see FIGS. 1, 2, and 7).

<Seat Cover>

Figure 3:
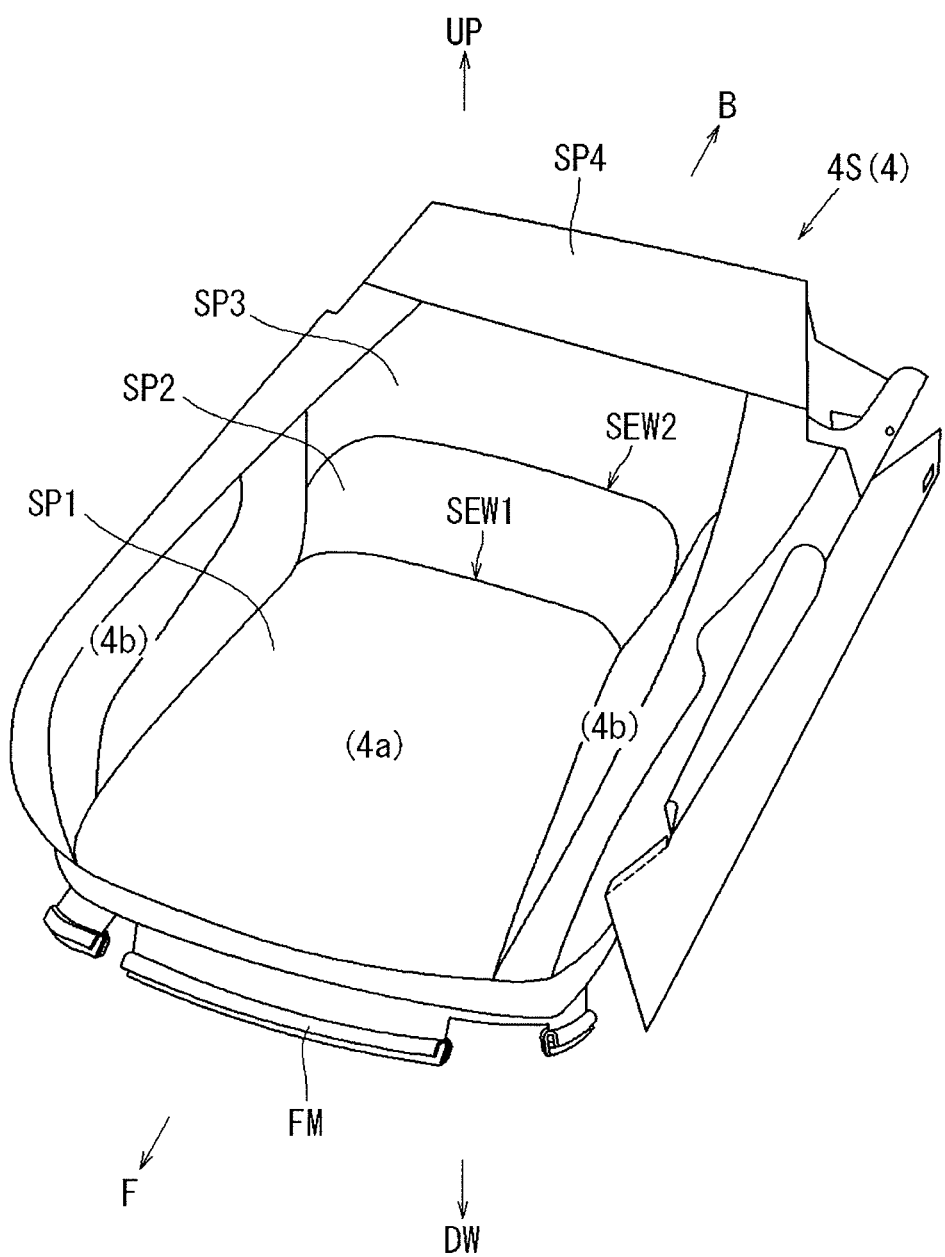
FIG. 3 is a perspective view of a seat cover.
Figure 8:
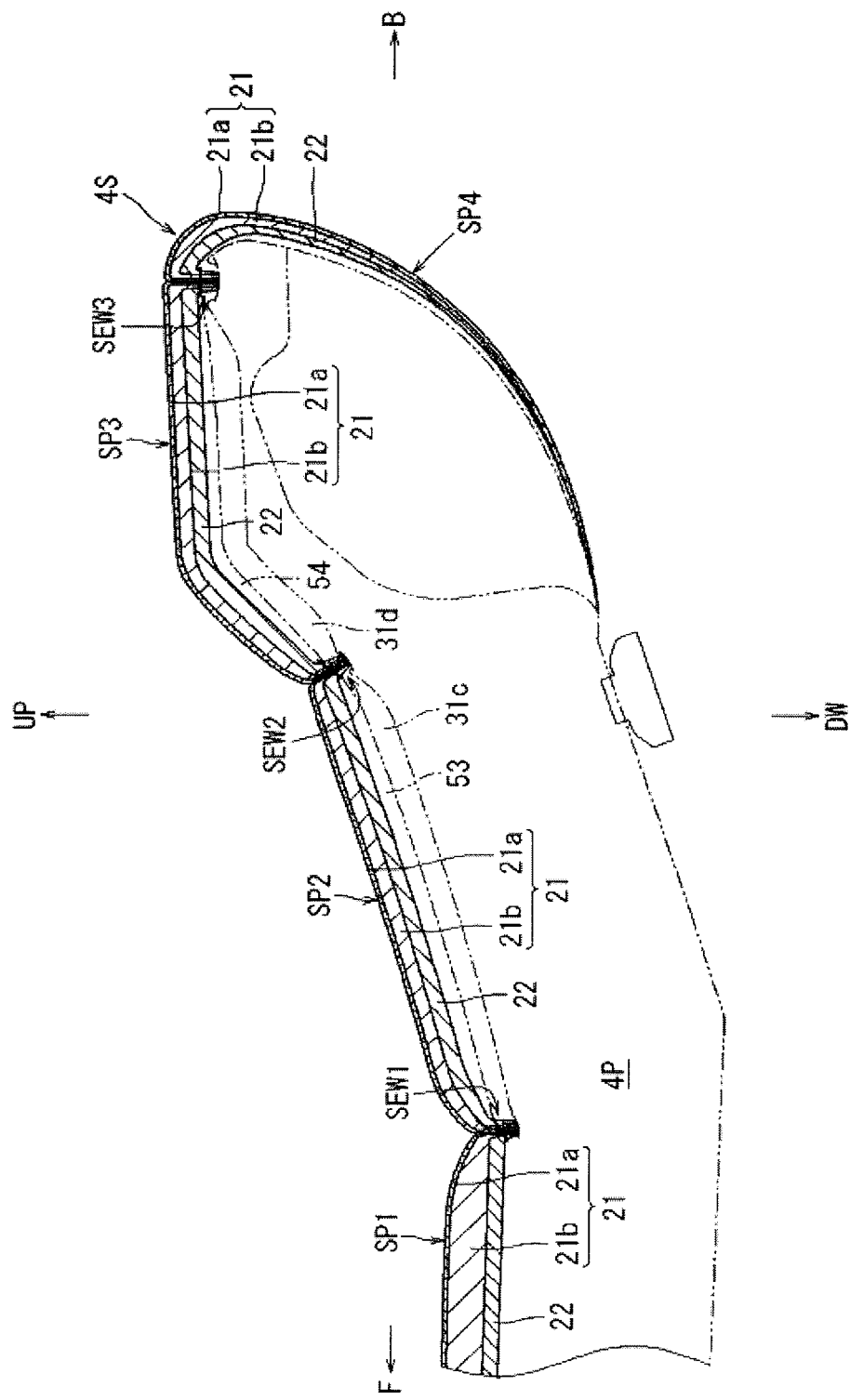
FIG. 8 is a partial cross-sectional view of the seat cover.

The seat cover 4S is a sheet-like member capable of covering the seating side of the seat pad 4P and can be formed by suturing a plurality of surface pieces (SP1 to SP4 and the like) (see FIGS. 3 and 8). For example, in this embodiment, the central part (part covering the main top plate portion) of the seat cover 4S can be formed by the first surface piece SP1 to the third surface piece SP3. The first surface piece SP1 is a large-sized piece which is long in the seat front-rear direction and covers the front part of the main top plate portion 4a. The second surface piece SP2 is a small-sized piece which is short in the seat front-rear direction and covers the middle part of the main top plate portion 4a. The third surface piece SP3 is a small-sized piece and covers the rear part of the main top plate portion 4a. The lateral parts of the seat cover 4S (parts covering the lateral top plate portions 4b) can be formed similarly by suturing a plurality of surface pieces (of which reference signs are not illustrated). A hook member FM is appropriately formed on the circumferential surface of the seat cover 4S (for example, an end of the rear surface piece SP4) and can be hooked on the seat frame 4F or the like.

Suture lines (SEW1 to SEW3 and the like) serving as design lines are formed between the neighboring surface pieces (see FIGS. 1, 3, and 8). For example, at the center of the seat cover 4S, the suture line SEW1 between the first surface piece SP1 and the second surface piece SP2 extends in the seat width direction and is curved to the front side at the lateral seat portion, which is excellent in design property. Similarly, the suture line SEW2 between the second surface piece SP2 and the third surface piece SP3 extends in the seat width direction and is curved to the front side at the lateral seat portion. The suture line SEW3 between the third surface piece SP3 and the rear surface piece SP4 typically extends in a straight shape in the seat width direction.

<First Part>

The seat cover 4S (each surface piece) is formed by stacking and integrating a first part 21 and a second part 22

Figure 6:
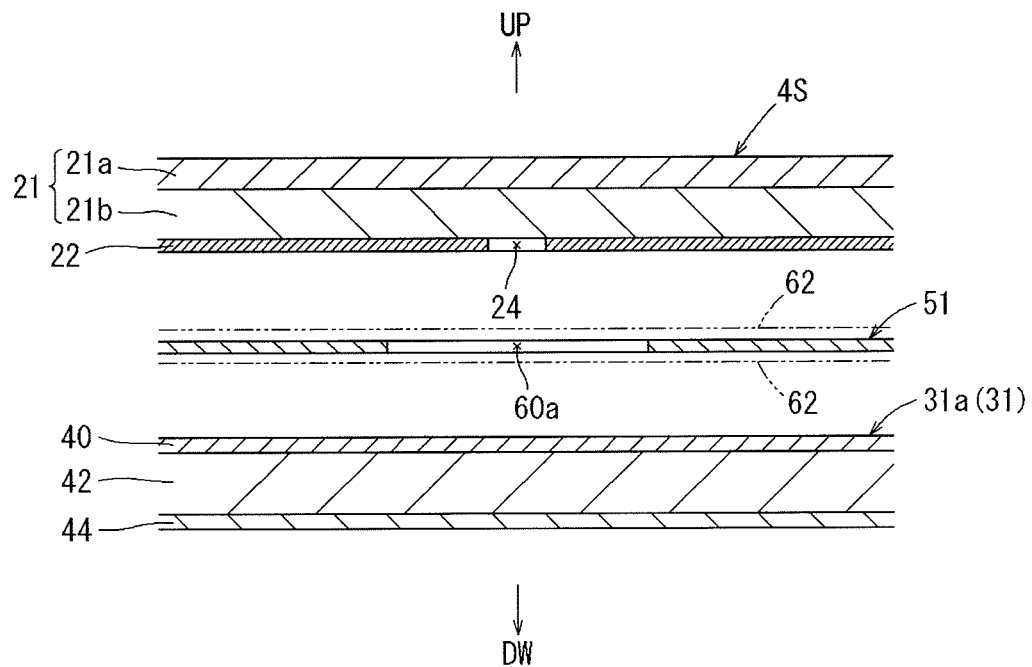
FIG. 6 is a cross-sectional view of the seat cover, an adhesive portion, and the functional member.

(see FIGS. 2 and 6). The first part 21 is formed of a surface material 21a and a flexible material 21b and is disposed on the seating surface side of the seat cover 4S. The surface material 21a is a sheet material having breathability and forms the seating surface of the seat cover 4S. Examples of the material of such a type of surface material 21a include fabric (such as woven fabric, knitted fabric, and non-woven fabric having through-holes), leather (such as natural leather and synthetic leather) having through-holes, and net structure. The flexible material 21b is a sheet material having breathability and is integrated with the rear surface of the surface material 21a. Examples of the material of such a type of flexible material 21b include high-breathability slab urethane (with a degree of breathability of 200 cc/cm$^2$·sec to 400 cc/cm$^2$·sec), cotton material, and 3D net structures (members formed by three-dimensionally knitting fabric).

<Second Part>

Figure 4:
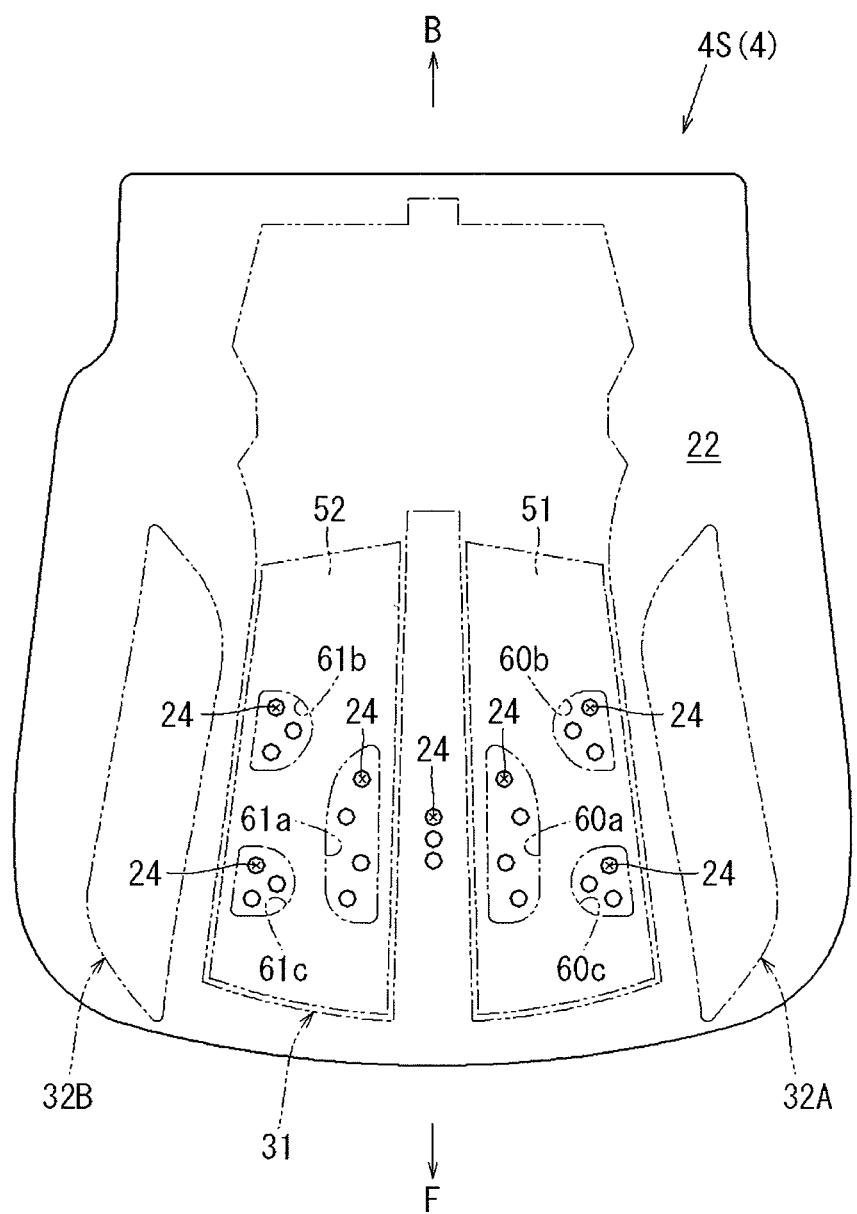
FIG. 4 is a partial rear view of the seat cover.
Figure 5:
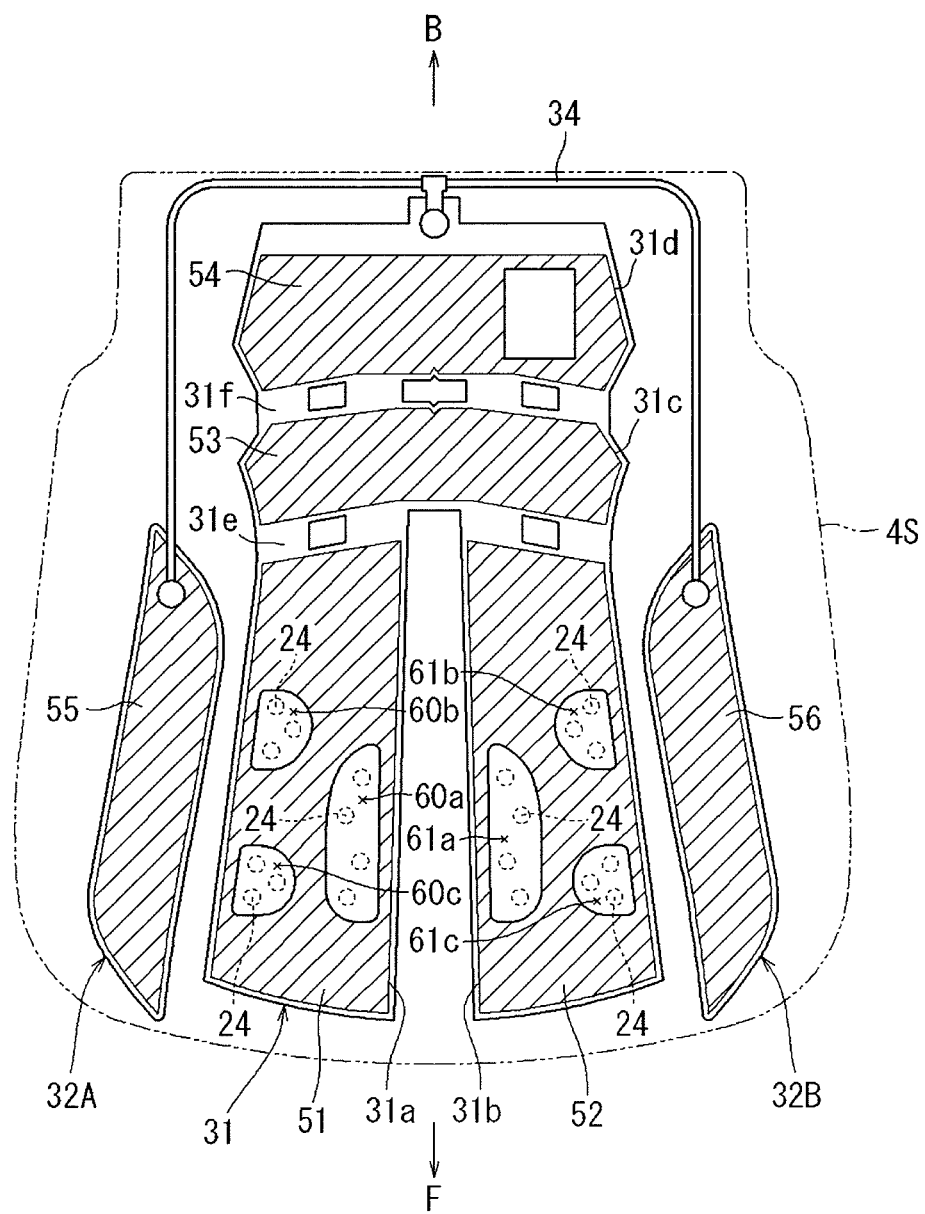
FIG. 5 is a top view of a plurality of functional members.

The second part 22 is a part which is stacked on the rear surface side of the first part 21 and includes a plurality of openings 24 (only some openings are referenced by reference signs for the purpose of convenience in FIGS. 4 and 5). The second part 22 is formed of a material poorer in breathability than the first part 21 or a non-breathable material and can suppress diffusion of a material (liquid resin) of the seat pad 4P to be described later as much as possible. Examples of the material of such a type of second part 22 include low-breathability slab urethane (with a degree of breathability of 0 cc/cm$^2$·sec to 10 cc/cm$^2$·sec), leather, and a resin layer (film-like). The openings 24 are hole parts through which gas can pass and penetrate the second part 22 in the thickness direction thereof (the first part 21 is exposed). In this embodiment, the plurality of openings 24 having a substantially circular shape in a top view can be formed at positions capable of facing the outlets 11, 12, 13 in a state where the seat pad is covered with the seat cover 4S (to be described later).

<Functional Member>

A plurality of functional members (a central functional member 31 and lateral functional members 32A and 32B) have a sheet shape, have breathability and appropriately have various functions such as a heater function or a sensor function (see FIGS. 1 and 5). The central functional member 31 (details of which will be described later) is a sheet member having a substantially rectangular shape which is long in the seat front-rear direction, similar to the central shape of the seat cover 4S, and is disposed at the center of the seat cover 4S (place covering the main top plate portion 4a). A pair of lateral functional members 32A and 32B are sheet members having a substantially rectangular shape which is relatively short in the seat front-rear direction and are disposed at lateral portions of the seat cover 4S (places covering the lateral top plate portions 4b). The functional members 31, 32A, and 32B are electrically connected to a power supply (not illustrated) via a three-forked wiring member 34.

The central functional member 31 is divided into a plurality of sections (a first functional portion 31a to a fourth functional portion 31d) and is disposed across a plurality of surface pieces SP1 to SP3 (see FIGS. 3 to 5). The first functional portion 31a and the second functional portion 31b are portions into which the front part of the central functional member 31 forks and are disposed to face the first surface piece SP1. The first functional portion 31a and the second functional portion 31b are arranged with an appropriate gap in the seat width direction and have a width such that each of the first functional portion 31a and the second functional portion 31b can be disposed to cross the inside outlets 12 and the outside outlets 13 (see FIGS. 2 and 5). The third functional portion 31c is a part which is located in the middle of the central functional member 31 and can face the second surface piece SP2. The fourth functional portion 31d is a part which is located in the rear part of the central functional member 31 and can face the third surface piece SP3. The first functional portion 31a and the second functional portion 31b are connected to the third functional portion 31c by a bridging portion 31e (place in which hole portions are formed) which is disposed therebetween. Similarly, the third functional portion 31c and the fourth functional portion 31d are connected to each other by a bridging portion 31f which is disposed therebetween.

The functional members 31, 32A, and 32B can be formed of a substantially same material. For example, the central functional member 31 is formed by integrating a conductive member 40, a breathable member 42, and a low-breathability member 44 in a stacked manner (see FIG. 6). The conductive member 40 is a sheet member including conductive wires (such as metal wires, carbon fibers, and plated wires) which are conductible and has appropriate breathability (for example, breathability not poorer than that of the surface material 21a or the flexible material 21b). The breathable member 42 is a sheet member having breathability almost equal to that of the flexible material 21b and can be formed of the materials exemplified for the flexible material 21b. The low-breathability member 44 is formed of a material poorer in breathability than the breathable member 42 or a non-breathable material and can be formed of the materials exemplified for the second part 22. By causing the conductive member 40 to emit heat in a conducted state, the functional members 31, 32A, and 32B can exhibit a heater function (temperature-raising function). By switching the conductive member 40 to a conductible state, the functional members 31, 32a, and 32B may function as electrodes of a capacitive sensor.

<Adhesive Portion>

The plurality of adhesive portions (a first adhesive portion 51 to a sixth adhesive portion 56) are interposed between the seat cover 4S and the functional members 31, 32A, and 32B to adhere them (see FIGS. 5 to 7). In this embodiment, the central functional member 31 is adhered to the center of the seat cover 4S with the first adhesive portion 51 to the fourth adhesive portion 54. At this time, the first adhesive portion 51 (which corresponds to the adhesive portion in the claims, details of which will be described later) has a shape similar to and slightly smaller than the first functional portion 31a and adheres the first functional portion 31a to the front part of the seat cover 4S. The second adhesive portion 52 (which corresponds to the adhesive portion in the claims, details of which will be described later) has a shape similar to and slightly smaller than the second functional portion 31b and adheres the second functional portion 31b to the front part of the seat cover 4S. The third adhesive portion 53 has a shape similar to and slightly smaller than the third functional portion 31c and adheres the third functional portion 31c to the middle part of the seat cover 4S. The fourth adhesive portion 54 has a shape similar to and slightly smaller than the fourth functional portion 31d and adheres the fourth functional portion 31d to the rear part of the seat cover 4S. Similarly, a pair of lateral functional members 32A and 32B are adhered to the lateral parts of the seat cover 4S by the fifth adhesive portion 55 and the sixth adhesive portion 56.

The adhesive portions 51 to 56 can be respectively formed as an adhesive layer formed of an adhesive or a sheet-like adhesive member (double-sided adhesive sheet member). In this embodiment, the adhesive portions 51 to 56 are formed of sheet-like adhesive members and have the substantially same basic configuration. For example, release members 62 are adhered to both surfaces of the first adhesive portion 51 (front and rear surfaces to which other members can be adhered and fixed) (see FIG. 6). By peeling off the release members 62, the corresponding functional members or the seat cover 4S can be adhered to the front surface and the rear surface of the first adhesive portion 51. The adhesive component of the adhesive portions is not particularly limited and examples thereof include inorganic components such as cement or ceramic, natural components such as natural rubber or starch, semi-synthetic components such as nitrocellulose, resin-based components such as thermoplastic resin or thermosetting resin, rubber-resin-based components such as chloroprene rubber or nitrile rubber, and complex components such as elastomer. The adhesive portions may have adhesive strength for adhering another member so as not to be detachable or may have adhesive strength for adhering to (sticking to) another member so as to be detachable.

<Passage Portion>

In this embodiment, the first adhesive portion 51 (which corresponds to the adhesive portion in the claims) includes a plurality of passage portions (an inside passage portion 60*a* and a pair of outside passage portions 60*b* and 60*c*) (see FIG. 5). Similarly, the second adhesive portion 52 (which corresponds to the adhesive portion in the claims) includes a plurality of passage portions (an inside passage portion 61*a* and a pair of outside passage portions 61*b* and 61*c*). Here, the passage portions have the substantially the same configuration between the first adhesive portion 51 and the second adhesive portion 52 and thus the first adhesive portion 51 will be exemplified as the configuration of each passage portion. That is, the passage portions 60*a* to 60*c* are through-holes penetrating the first adhesive portion 51 in the thickness direction thereof and gas can pass therethrough. The inside passage portion 60*a* is a hole portion having a substantially rectangular shape of a slightly larger size in a top view and has a size covering all of the inside outlets 12 and all of the openings 24 facing the inside outlets 12 (see FIGS. 2, 4, and 7). The inside passage portion 60*a* is disposed between all of the inside outlets 12 and all of the corresponding openings 24 at the time of being covered with the seat cover 4S (which will be described later). The pair of outside passage portions 60*b* and 60*c* are hole portions of a slightly small size having a substantially rectangular shape in a top view and has a size capable of respectively covering each outside outlet 13 and all of the openings 24 facing the corresponding outside outlet 13 (see FIGS. 2 and 4). Each of the outside passage portions 60*b* and 60*c* are respectively disposed between each outside outlet 13 and all of the corresponding openings 24 at the time of being covered with the seat cover 4S (which will be described later).

<Formation of Seat Cover>

Referring to FIGS. 3 and 8, a plurality of surface pieces are sutured to form the seat cover 4S capable of covering the seat pad 4P (the main top plate portion 4*a* and the lateral top plate portions 4*b*). At this time, at the positions corresponding to the main top plate portion 4*a*, the first surface piece SP1, the second surface piece SP2, and the third surface piece SP3 are arranged in this order from the front side of the seat to the rear side and are sutured by using a sewing machine (not illustrated). At this time, in this embodiment, since the surface pieces are separate members, the surface pieces superposed in a folded shape can be sutured while the directions thereof are appropriately changed (which is a configuration suitable for a suturing operation). Accordingly, while appropriately changing the directions of the first surface piece SP1 and the second surface piece SP2, the suture line SEW1 therebetween can be formed in the seat width direction and can be smoothly curved in the seat side parts (see FIG. 3). Similarly, while appropriately changing the directions of the second surface piece SP2 and the third surface piece SP3, the suture line SEW2 therebetween can be formed in the seat width direction and can be smoothly curved in the seat side parts.

<Integrating Seat Cover and Functional Member>

The seat cover 4S and the functional members 31, 32A, and 32B are adhered to each other with the adhesive portions 51 to 56 so as to be integrated (see FIGS. 4 and 5). For example, in this embodiment, the front sides of the first adhesive portion 51 to the fourth adhesive portion 54 are adhered to proper positions of the central functional member 31 (see FIG. 5). Then, the rear sides of the first adhesive portion 51 to the fourth adhesive portion 54 are adhered to proper positions of the central rear surface along with the central functional member 31. Similarly, the lateral functional members 32A and 32B are adhered to proper positions of the rear surface of the lateral parts of the seat cover 4S with the fifth adhesive portion 55 (the sixth adhesive portion 56) so as to be integrated.

In this embodiment, the first functional portion 31*a* and the second functional portion 31*b* are adhered to the central front part of the seat cover 4S so as to be integrated while forming a gap therebetween (forming a clearance for disposing the central outlet 11). In order to allow passing of gas, the inside passage portion 60*a* of the first adhesive portion 51 is disposed opposite to the corresponding openings 24 (the openings facing the inside outlets 12) and covers the entire openings (see FIGS. 2, 4, and 6). The outside passage portions 60*b* and 60*c* of the first adhesive portion 51 are disposed opposite to the corresponding openings 24 (the openings facing the inside outlets 12) and cover the entire openings (see FIGS. 2, and 4). Similarly, the inside passage portion 61*a* and the outside passage portions 61*b* and 61*c* of the second adhesive portion 52 are disposed opposite to the corresponding openings 24 and cover the entire openings (see FIG. 4).

<Formation of Seat Pad (Covering of Seat Cover)>

In this embodiment, the seat pad 4P is integrated with the seat cover 4S (the functional members) while molding the seat pad using a molding machine (see FIGS. 7 and 8). At this time, the seat cover 4S is disposed in a cavity (molding space) of the molding machine in advance so as to cause the functional member side (the low-breathability member 44) to face the inside of the cavity. In this embodiment, the main top plate portion 4*a* of the seat pad 4P has a shape swelling while being curved upward on the rear side of the seat (see FIG. 8). Accordingly, along the shape of the seat pad 4P, the rear part of the seat cover 4S is curved to face the upside and the seat pad is disposed in the cavity.

A molding material (liquid resin) is foamed in the cavity to mold the seat pad 4P. At this time, in this embodiment, excessive impregnation of the molding material into the functional members (the breathable member 42) is suppressed by the low-breathability member 44 (see FIG. 7). Excessive impregnation of the molding material into the part (the flexible material 21*b*) of the seat cover 4S not covered with the functional members 31, 32A, and 32B is suppressed by the second part 22 (see FIGS. 4 and 7). In this way, the seat cover 4S can be integrated along the outer surface of the seat pad 4P without damaging the flexibility of the first part 21 as much as possible. Particularly, in this embodiment, the seat cover 4S can be disposed in close contact with the rear part of the main top plate portion 4a (the swelled part) together with the central functional member 31. Therefore, a problem in that only the seat cover 4S floats or the like is avoided.

After the seat pad 4P, the functional members 31, 32A, and 32B, and the seat cover 4S are integrated in this way, the flow channel portions 10 are formed to the seat pad 4P (see FIG. 7). At this time, the front part of the seat pad 4P is punched with a punching member (not illustrated) from the rear side at parts corresponding to the formation positions of the passage portions. At this time, the punching member penetrates the seat pad 4P (forms the flow channel portion 10), penetrates the low-breathability member 44 of the central functional member 31, and reaches the breathable member 42. Accordingly, in this embodiment, the flow channel portions 10 (the outlets) can be formed to face the passage portion 60a and the like and the openings 24 (the passage portions and the openings can be disposed in a moving path of gas) (see FIGS. 2, 4, and 7). Similarly, the flow channel portions 10 can be formed so as to face the passage portion 61a and the like and the openings 24 of the second part 22 (see FIGS. 2 and 4).

<Use of Blowing Member and Functional Member>

Referring to FIG. 1, the vehicle seat 2 on which an occupant sits exhibits the blowing function and the heater function (comfort is improved). In this embodiment, by supplying power to the functional members 31, 32A, and 32B (causing the functional members to perform the heater function), the occupant in a seated state can be heated. Gas fed from the blowing member 9 passes through the seat pad 4P (the flow channel portions 10), the central functional member 31, and the seat cover 4S and blows out of the seat. At this time, the first adhesive portion 51, the second adhesive portion 52, and the second part 22 of the seat cover 4S are disposed on the front part (flow channel portions 10) of the seat cushion 4 (see FIGS. 2, 4, and 7). Accordingly, in the above-described seat configuration, the parts having poor breathability (the adhesive portions 51 and 52 and the second part 22) may interfere with the flow of gas to deteriorate the blowing performance.

Therefore, in this embodiment, the passage portions 60a to 60c (61a to 61c) are formed in the first adhesive portion 51 (the second adhesive portion 52) and the openings 24 are formed in the second part 22 (see FIGS. 4, 5, and 7). The passage portions 60a to 60c and 61a to 61c and the openings 24 are respectively disposed at positions facing the flow channel portions 10 (in the moving path of gas) (see FIGS. 2, 4, and 5). Accordingly, gas fed from the blowing member 9 can smoothly pass through the adhesive portions 51 and 52 and the second part 22 via the passage portions and the openings. For example, referring to FIG. 7, gas emitted from the flow channel portions 10 passes through the first functional portion 31a and reaches the first adhesive portion 51 (part having poor breathability). At this time, gas is smoothly emitted to the seat cover 4S through the inside passage portion 60a. The gas is smoothly emitted to the outside of the seat by passing through the openings 24 of the second part 22 and passing through the first part 21. Accordingly, in this embodiment, the gas fed from the blowing member 9 can be blown to the outside without being blocked by the parts (the adhesive portions 51 and 52 and the second part 22) having poor breathability as much as possible.

As described above, in this embodiment, the functional members 31, 32A, and 32B are disposed between the seat cover 4S and the seat pad 4P with the corresponding adhesive portions 51 to 56 interposed therebetween (stably disposed). A specific adhesive portion 51 (52) does not interfere with the flow of gas emitted from the seat pad 4P to the seat cover 4S as much as possible by the passage portions 60a to 60c (61a to 61c). In this embodiment, even in a configuration in which the seat pad 4P is integrated with the seat cover 4S at the same time as molding the seat pad 4P, impregnation of the molding material into the first part 21 can be suppressed as much as possible by the second part 22 (the flexibility of the first part 21 is not damaged as much as possible). The second part 22 does not interfere with the flow of gas passing through the seat cover 4S as much as possible by the openings 24. In this embodiment, by causing the passage portions 60a to 60c (61a to 61c) to cover the openings 24, gas is smoothly emitted from the central functional member 31 to the seat cover 4S. Accordingly, in this embodiment, the central functional member 31 can be disposed by adhesion between the seat cover 4S and the seat pad 4P with improved performance.

The vehicle seat according to this embodiment is not limited to the above-described embodiment and can have various other embodiments. For example, in this embodiment. the seat cover 4S and the seat pad 4P are integrated at the time of molding. Unlike this, the seat pad may be covered with the seat cover after the seat pad is molded. In this case, the functional members can be adhered to the seat pad side (above the flow channel portions) so as to be integrated.

In this embodiment, although the configurations of the seat pad 4P and the seat cover 4S are exemplified, the configurations thereof can be appropriately modified. For example, the configuration (such as the shape, the size, the formation position, and the number) of the flow channels (outlets) can be appropriately changed depending on the seat configuration. For example, the flow channel portions can be appropriately formed at two or more positions or a single position of the main top plate portion and the lateral top plate portions. The seat cover may include only the surface material and the flexible material and the second part may be appropriately omitted. The shape, the size, or the number of surface pieces constituting the seat cover can be appropriately changed and the configuration of the suture lines can be appropriately changed. The configuration of the openings can be appropriately changed depending on the configuration of the outlets or the passage portions.

In this embodiment, although the configuration (such as the shape, the size, the formation position, the number, and the function) of the functional members 31, 32A, and 32B is exemplified, the configuration of the members is not limited to this example. For example, the functional member may include only a part (sheet-like or linear conductive member) exhibiting the function. The functional members may have a function of reinforcing the seat cover by forming the functional members by a sheet material or a mat material having elasticity (for example, polyurethane foam).

In this embodiment, although the configuration (such as the shape, the size, the formation position, and the number) of the adhesive portions 51 to 56 is exemplified, the configuration of the portions can be appropriately modified depending on the configuration of the seat cover or the seat pad. For example, in this embodiment, the adhesive portion including the passage portion is disposed in the front part of the seat cushion, but the position of the adhesive portion can be changed depending on the formation position of the flow channel portions. The configuration (such as the shape, the size, the formation position, and the number) of the passage portions can be appropriately modified as long as gas can pass therethrough. For example, the passage portions may be disposed to slightly depart from the outlets of the flow channel portions or the openings as long as it does not extremely interfere with the flow of gas. The passage portions may have a size smaller than the outlets or the openings as long as it does not extremely interfere with the flow of gas.

Although the seat cushion 4 has been exemplified in this embodiment, the configuration according to this embodiment can be applied to various seat constituent members such as a seat back or a headrest. The blowing member may have a configuration capable of suctioning gas. In this case, gas is blown into the seat through the seat cover and the seat pad. The configuration according to this embodiment can be applied to all vehicle seats of a car, an aircraft, a subway train, and the like.

What is claimed is:

1. A vehicle seat comprising:
    a seat pad forming an outer shape of the seat, configured to elastically support an occupant, and including a flow channel portion through which gas is configured to pass;
    a seat cover covering the seat pad and having breathability;
    a functional member disposed between the seat pad and the seat cover and having breathability; and
    a blowing member configured to feed and suction gas, wherein
    the blowing member is configured to blow the gas into or out of the seat through the flow channel portion of the seat pad and the seat cover along a flow path,
    the functional member is integrated with any one of the seat pad and the seat cover with an adhesive portion, which has poorer breathability than the seat cover and the functional member, the adhesive portion being interposed between the seat cover and the functional member, and
    the adhesive portion includes a passage portion through which the gas is configured to pass, and the passage portion is disposed in the flow path of the gas.

2. The vehicle seat according to claim 1, wherein the seat cover includes:
    a first part having breathability and forming a seating surface; and
    a second part stacked on a rear surface side of the first part facing the functional member and being poorer in breathability than the first part, and
    the second part includes an opening for exposing the first part, and the opening is disposed in the flow path of the gas.

3. The vehicle seat according to claim 2, wherein the passage portion and the opening are disposed opposite to each other and the passage portion covers the entire opening.

4. The vehicle seat according to claim 2, wherein the opening includes a first opening and a second opening, and
    the passage portion and the first and second openings are disposed opposite to each other and the passage portion covers the first and second openings.

5. The vehicle seat according to claim 1, wherein the passage portion is a through-hole.

6. The vehicle seat according to claim 1, wherein the functional member is a heater member.

7. The vehicle seat according to claim 1, wherein the seat cover includes:
    a first part having breathability and having a seating surface; and
    a second part stacked on a rear surface of the first part facing the functional member and being poorer in breathability than the first part, wherein
    the second part includes an opening for exposing the first part, and the opening is disposed in the flow path of the gas, and
    the first part and the second part are in direct contact with each other.

8. A vehicle seat comprising:
    a seat pad including a first through-hole penetrating the seat pad in a thickness direction of the seat pad;
    a seat cover covering the seat pad and having breathability;
    a functional member disposed between the seat pad and the seat cover in the thickness direction and having breathability;
    an adhesive portion by which the functional member is integrated with any one of the seat pad and the seat cover, the adhesive portion having poorer breathability than the seat cover and the functional member and including a second through-hole penetrating the adhesive portion in the thickness direction; and
    a blowing member communicating with the first through-hole and configured to feed and suction gas, wherein
    the first through-hole and the second through-hole overlap with each other in the thickness direction, and
    the adhesive portion is interposed between the seat cover and the functional member.

9. The vehicle seat according to claim 8, wherein the seat cover includes:
    a first part having breathability and having a seating surface; and
    a second part stacked on a rear surface of the first part which is opposite to the seating surface and being poorer in breathability than the first part,
    the second part includes an opening for exposing the first part, and
    the opening overlaps with the first through-hole and the second through-hole in the thickness direction.

10. The vehicle seat according to claim 9, wherein the entire opening overlaps with the second through-hole in the thickness direction.

11. The vehicle seat according to claim 8, wherein the second through-hole is larger than the first through-hole.

12. The vehicle seat according to claim 8, wherein the seat cover includes:
    a first part having breathability and having a seating surface; and
    a second part stacked on a rear surface of the first part which is opposite to the seating surface and being poorer in breathability than the first part, wherein
    the second part includes an opening for exposing the first part,
    the opening overlaps with the first through-hole and the second through-hole in the thickness direction, and
    the first part and the second part are in direct contact with each other.

* * * * *